(12) United States Patent
Tanigaki et al.

(10) Patent No.: US 6,505,725 B2
(45) Date of Patent: Jan. 14, 2003

(54) ELECTROMAGNETIC CLUTCH DEVICE FOR A COMPRESSOR

(75) Inventors: Ryuhei Tanigaki, Nishi-kasugai-gun (JP); Shin Watabe, Nishi-kasugai-gun (JP); Minoru Kawada, Nishi-kasugai-gun (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 2 days.

(21) Appl. No.: 09/724,998

(22) Filed: Nov. 29, 2000

(65) Prior Publication Data

US 2001/0004037 A1 Jun. 21, 2001

(30) Foreign Application Priority Data

Dec. 15, 1999 (JP) ............................................. 11-356671

(51) Int. Cl.[7] ............................................... F16D 27/10
(52) U.S. Cl. .............................. 192/84.961; 192/110 B; 418/55.1
(58) Field of Search ......................... 192/84.961, 84.96, 192/84.9, 84.3, 110 B, 110 R; 418/55.1; 417/223

(56) References Cited

U.S. PATENT DOCUMENTS 3,876,048 A * 4/1975 Briar ........................ 192/30 V
5,295,812 A    3/1994 Steele

FOREIGN PATENT DOCUMENTS

| FR | 2592926 A1 | * 7/1987 |
| JP | 57-167530 A | * 10/1982 |
| JP | 9-53662 | 2/1997 |
| JP | 9-196088 | 7/1997 |

* cited by examiner

*Primary Examiner*—Saul Rodriguez
(74) *Attorney, Agent, or Firm*—Oblon, Spivak, McClelland, Maier & Neustadt, P.C.

(57) ABSTRACT

The present invention relates to an electromagnetic clutch device for a compressor used for air conditioners in vehicles and so forth. The object of the present invention is to provide an electromagnetic clutch device whose pulley can be downsized regardless of the outer diameter of a coil even when the so-called alignment is small. In order to achieve this object, an electromagnetic clutch device according to the present invention comprises a drive shaft forming a part of a compressor mechanism which is accommodated in a housing of the compressor and projecting through a nose of the housing; a drive rotor accommodating a coil for the electromagnetic clutch and rotatably supported on the circumference of the nose by means of a clutch bearing; an armature plate opposing the coil and connected to a projecting end of the drive shaft so as to rotate with the drive shaft; and a pulley fixedly attached to the drive rotor, wherein the pulley is arranged between the housing and the coil.

7 Claims, 2 Drawing Sheets

ELECTROMAGNETIC CLUTCH DEVICE FOR A COMPRESSOR

BACKGROUND OF THE INVENTION

1. Field of the Invention

This invention relates to an electromagnetic clutch device for a compressor used for air conditioners on vehicles and so forth.

2. Background Art

A conventional electromagnetic clutch device for a compressor incorporated in air conditioners on vehicles and so forth is known, for example, from Japanese Patent Application Laid-Open No. Hei 9-53662, and the device will be briefly explained below with reference to FIG. 2.

In the compressor shown in FIG. 2 having an electromagnetic clutch device, a housing 1 comprises cup-shaped body 2 and a front case 4 fastened to the body 2 by means of bolts (not shown).

A scroll type compressing mechanism C consisting of a fixed scroll 10 and a revolving scroll 14 is accommodated in the housing 1. The fixed scroll 10 comprises an end plate 11 fastened to the cup-shaped body 2 by bolts 13 and whorled wraps 12 which are formed on the inner surface of the end plate 11. The revolving scroll 14 comprises an end plate 15 and whorled wraps 16 which are formed on the inner surface of the end plate 15. The revolving scroll 14 and the fixed scroll 10 engage each other in such a way that their centers are separated from each other by the radius of their revolution and the phase difference between them is 180 degrees. As a result, a plurality of sealed chambers 19a and 19b are formed substantially symmetrically about the center of the whorls of the scrolls.

A cylindrical boss 20 is formed at the center of the outer surface of the end plate 15 in which a drive bush 21 is rotatably accommodated via a revolving bearing 23. The drive bush 21 has an eccentric hole 24 in which an eccentric drive pin 25 projecting from a drive shaft 7 toward the inside of the housing 1 is rotatably engaged. The drive shaft 7 extends to the outside of the housing 1 through a nose 6 of the front case 4 and is supported in the front case 4 by means of bearings 8 and 9.

A drive rotor 42 is rotatably supported on the circumference of the nose 6 of the front case 4 by means of a clutch bearing 41. The drive rotor 42 accommodates coil 43 toward which an armature plate 49 faces. A hub 44 is fixedly connected to a projecting end of the drive shaft 7 by means of a nut 45. One end of each leaf spring 46 is connected to the hub 44 by pin 47 and the other end of each leaf spring 46 is fixed to the armature plate 47 by pin 48. An electromagnetic clutch device CL is formed by the clutch bearing 41, the drive rotor 42, the coil 43, the hub 44, the leaf springs 46, the pins 47 and 48, and the armature plate 49 as described above.

Pulley grooves 61 are formed on the outer periphery of the drive rotor 42 which is connected to a power source such as an engine via a V-belt or the like (not shown) which is laid on the pulley grooves 61 so as to be driven whenever the power source is in operation. When electric current is supplied to the coil 43, the armature plate 49 becomes attached to the drive rotor 42 due to magnetic force after overcoming the resilient force of the leaf springs 46. As a result, the drive shaft 7 of the scroll type compressing mechanism starts to rotate since rotation of the drive rotor 42 is transmitted to the drive shaft 7 via the armature plate 49, pins 48, leaf springs 46, pins 47 and hub 44 in this sequence. In this state, when the electric current is cut off, the armature plate 49 detaches from the drive rotor 42 due to the restoring force of the leaf springs 46, thus, the power transmission to the drive shaft 7 ceases.

When the drive shaft rotates, the revolving scroll 14 is driven via the eccentric drive pin 25, the drive bush 21, revolving bearing 23 and the boss 20. The revolving scroll 14 revolves on a circular orbit while its rotation is prevented by an anti-rotation mechanism 26. As a result, the contact lines between the whorled wraps 12 and 16 move toward the center of the whorl, at the same time, the sealed chambers 19a and 19b move toward the center of the whorl while their volumes are decreasing. Simultaneously, a refrigerant gas is sucked into an inlet chamber 28 through an inlet port (not shown), moves into the sealed chambers 19a and 19b via outer openings of the whorled wraps 12 and 16, reaches a center chamber 19c while being compressed, further moves through an outlet port formed in the end plate 11 of the fixed scroll 10, opens an outlet valve 30 by its pressure, moves into an outlet cavity 31, and then, goes out through an outlet port 37. In FIG. 2, reference numeral 35 indicates a retainer for the outlet valve 30; 36 indicates a bolt for fixing the outlet valve 30 and the retainer 35; 38 indicates sealing parts; 27 indicates a balance weight fixed to the drive bush 21; 39 indicates a balance weight fixed to the drive shaft 7; and 22 indicates a thrust bearing.

In the electromagnetic clutch device for a compressor constructed in the above-mentioned manner, it is required that the pulley grooves 61 be formed on the outer periphery of the drive rotor 42, the outer periphery is located to the outside of the coil 43, when the distance between the compressor body (housing) and the drive rotor 42 (in general, this distance is referred to as an alignment) needs to be reduced due to requirements for arranging other parts on the vehicle. When the rotational speed of the compressor needs to be increased, the diameter of the drive side pulley attached to a power source, such as an engine, must be increased because the diameter of the drive rotor 42 (pulley) cannot be reduced due to the coil 43 accommodated in it.

However, it is generally difficult to have sufficient space in order to enlarge the drive side pulley. In addition, an enlarged pulley leads to a weight increase and to a cost increase. Therefore, it is almost impossible to increase the rotational speed of the compressor, which means that the cooling capacity of the air conditioner cannot be increased either.

SUMMARY OF THE INVENTION

The object of the present invention is to overcome the above-mentioned disadvantages of the prior art and to provide an electromagnetic clutch device whose pulley can be downsized without any restrictions from the outer diameter of a coil even when the alignment is small.

In order to achieve the object, the present invention incorporates the structure described below.

An electromagnetic clutch device for a compressor according to claim 1 comprises a drive shaft forming a part of a compressor mechanism which is accommodated in a housing of the compressor and projecting through a nose of the housing; a drive rotor accommodating a coil for the electromagnetic clutch and rotatably supported on the circumference of the nose by means of a clutch bearing; an armature plate opposing the coil and connected to a projecting end of the drive shaft so as to rotate with the drive shaft; and a pulley fixedly attached to the drive rotor, wherein the pulley is arranged between the housing and the coil.

With this electromagnetic clutch device for a compressor, it is possible to select the diameter of the pulley without having any restrictions on the outer diameter of the coil.

An electromagnetic clutch device for a compressor according to claim 2 comprises a drive shaft forming a part of a compressor mechanism which is accommodated in a housing of the compressor and projecting through a nose of the housing; a drive rotor accommodating a coil for the electromagnetic clutch and rotatably supported on the circumference of the nose by means of a clutch bearing; an armature plate opposing the coil and connected to a projecting end of the drive shaft so as to rotate with the drive shaft; and a pulley fixedly attached to the drive rotor, wherein the pulley is arranged between the housing and the coil and the diameter of the pulley is smaller than that of the drive rotor.

With this electromagnetic clutch device for a compressor, it is possible to make the diameter of the pulley smaller than that of the drive rotor without having any restrictions on the outer diameter of the coil, thus, the rotational speed of the compressor can be increased due to the decreased diameter of the pulley.

It is preferable that the center of a region, in which pulley grooves are formed, of the pulley fixedly attached to the drive rotor and the mid-width of the clutch bearing (the center line of the clutch bearing width) are arranged at positions on the same line or close to each other. As a result, it is possible to reduce the load which is applied to the clutch bearing for supporting the moment generated by the tension of the belt laid on the pulley.

DETAILED DESCRIPTION OF THE PREFERRED EMBODIMENTS

A preferred embodiment of the electromagnetic clutch device for a compressor according to the present invention will be explained hereinafter with reference to FIG. 1.

Figure 1:
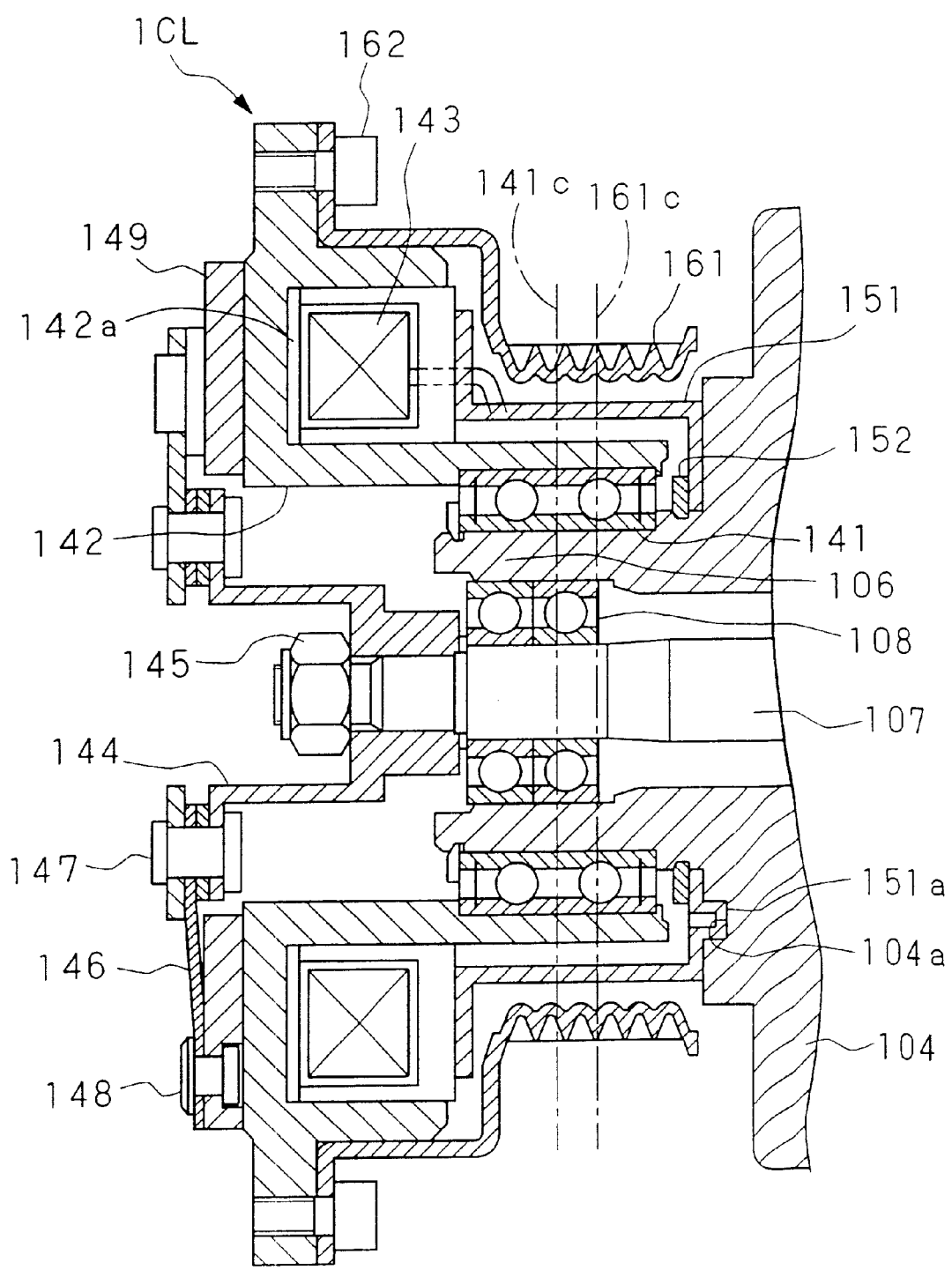
FIG. 1 is a cross-sectional view of the electromagnetic clutch device according to the present invention incorporated into a compressor.
Figure 2:
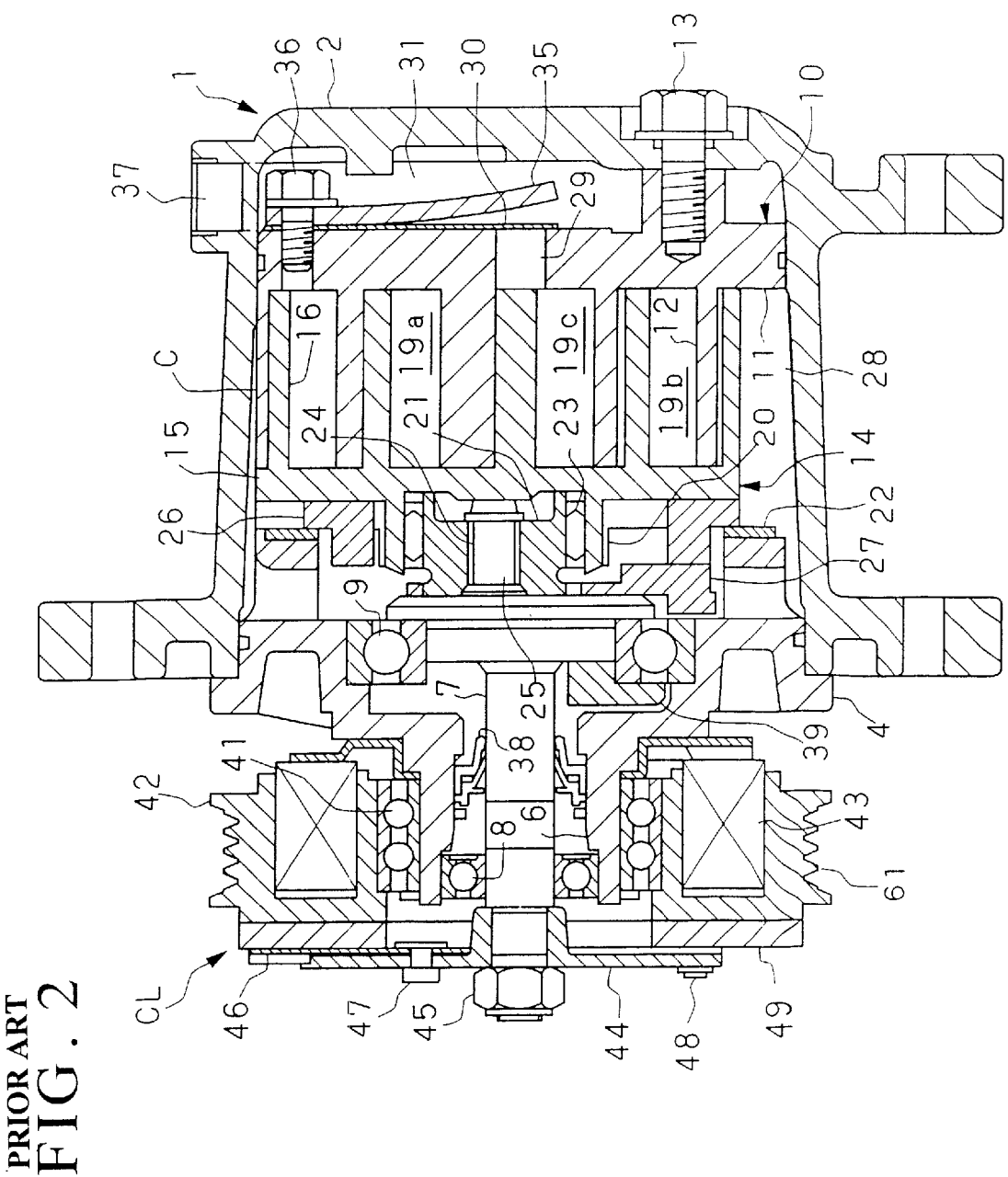
FIG. 2 is a cross-sectional view of a compressor with a conventional electromagnetic clutch device.

FIG. 1 is a cross-sectional view of the electromagnetic clutch device incorporated into a compressor. As shown in FIG. 1, a drive shaft 107 is provided to drive the compressing mechanism accommodated in a housing consisting of a cup-shaped body (not shown) and a front case 104. The drive shaft 107 projects through the nose 106 of the front case 104 and is supported in the nose 106 via bearings 108.

A drive rotor 142 is rotatably supported on the outer circumference of the nose 106 via a clutch bearing 141. A pulley 161 fixed to the drive rotor 142 by bolts 162 is arranged between the housing of the compressor and a coil 143. The center 161c of a region, in which pulley grooves are formed, of the pulley 161 and the mid-width 141c of the clutch bearing 141 are arranged at positions on the same line or close to each other, where the mid-width 141c means the center line of the clutch bearing width.

The coil 143 is accommodated in the recess 142a formed in the drive rotor 142 without contact with the recess 142a. An armature plate 149 is arranged so as to face toward the coil 143 with the drive rotor 142 intervening between them. A coil stay 151 is fixedly attached to the coil 143 and is also attached to the front case 104 by a retainer 152.

The coil stay 151 is positioned relative to the front case 104 by forming a plurality of projections 151a on the surface of the coil stay 151 facing the front case 104, forming recesses 104a corresponding to the projections 151a on the surface of the front case 104 and making the projections 151a engage the recesses 104a.

A hub 144 is fixed to the projecting end of the drive shaft 107 by a nut 145. One end of each leaf spring 146 is fixed to the hub 144 via pins 147 and the other end of each leaf spring 146 is fixed to the armature plate 149 via pin 148.

The clutch bearing 141, the drive rotor 142, the coil 143, the hub 144, the leaf springs 146, the pins 147 and 148, and the armature plate 149 thus form an electromagnetic clutch device 1CL.

The pulley 161 fixed to the drive rotor 142 is functionally connected to a power source such as an engine via a V-belt (not shown), so that the drive rotor 142 rotates whenever the power source is in operation.

The operation of the electromagnetic clutch device 1CL is as follows.

The drive rotor 142 is functionally connected to the power source such as an engine via a V-belt (not shown) which is laid on the pulley 161 fixed to the drive rotor 142 and it rotates whenever the power source is in operation.

In this state, when electric current is supplied to the coil 143, the armature plate 149 becomes attached to the drive rotor 142 by magnetic force after overcoming the resilient force of the leaf springs 146. As a result, the rotation of the drive rotor 142 is transmitted to the drive shaft 107 via the armature plate 149, the pins 148, the leaf springs 146, the pins 147 and the hub 144 in this sequence, then the drive shaft 107 rotates and the compressor is in operation.

In this state, when the electric current to the coil 143 is cut off, the armature plate 149 detaches from the drive rotor 142 due to the restoring force of the leaf springs 146, thus, the power transmission to the drive shaft 107 ceases.

In this embodiment, it is possible to make the outer diameter of the pulley 161 smaller than that of the drive rotor 142 since the pulley 161 fixed to the drive rotor 142 is arranged between the housing of the compressor and the coil 143, thus, the diameter of the pulley 161 is not restricted by the outer diameter of the coil unlike the case in which the pulley is arranged in the outside area of the coil 143.

As a result, the output volume of the refrigerant discharged from the compressor in a given period is increased and the cooling capacity of the compressor is improved because the rotational speed of the drive shaft 107 is increased due to the reduced diameter of the pulley 161, provided that the diameter of the pulley attached to the power source such as an engine is unchanged.

The center 161c of a region, in which pulley grooves are formed, of the pulley 161 and the mid-width 141c of the clutch bearing 141 are arranged at positions on the same line or close to each other, and the pulley 161 is fixedly attached to the drive rotor 142 via the bolts 162.

As a result, the durability of the compressor can be increased since the load applied to the clutch bearing 141 for supporting the moment generated by the tension of the belt laid on the pulley 161 is decreased.

In summary, the electromagnetic clutch device according to the present invention described above has the advantage that design flexibility is enhanced since the pulley fixed to the drive rotor is arranged between the housing of the compressor and the coil, thus, the diameter of the pulley can be selected regardless of the outer diameter of the coil even if the so-called alignment is small.

It is possible to increase the rotational speed of the compressor by reducing the diameter of the pulley attached to the drive rotor. With this design, the output volume of the refrigerant discharged from the compressor in a given period is increased, the cooling capacity of the compressor is improved, and thus the performance of the air conditioner installed in a vehicle is greatly improved.

Another advantage of the clutch device according to the present invention is that the durability of the compressor can be increased since the center of a region, in which pulley grooves are formed, of the pulley and the mid-width of the clutch bearing are arranged at positions on the same line or close to each other, and thus, the load applied to the clutch bearing for supporting the moment generated by the tension of the belt laid on the pulley is decreased.

What is claimed is:

1. An electromagnetic clutch device for a compressor, comprising:
    a drive shaft forming a part of a compressor mechanism which is accommodated in a housing of the compresssor and projecting through a nose of the housing;
    a drive rotor accommodating a coil for the electromagnetic clutch and rotatably supported on the circumference of the nose by a clutch bearing;
    an armature plate opposing the coil and connected to a projecting end of the drive shaft so as to rotate with the drive shaft;
    a pulley fixedly attached to the drive rotor; and
    a coil stay having a first end fixedly attached to the coil and a second end directly attached to a front face of the housing, the front face extending in a direction generally perpendicular to an axis of the drive shaft and the nose of the housing extending from the front face in a direction generally along the axis of the drive shaft, the coil stay having a projection on a surface facing the front face of the housing, the projection being received within a recess on the front face of the housing,
    wherein the pulley is arranged between the housing and the coil.

2. An electromagnetic clutch device for a compressor according to claim 1, wherein and the diameter of the pulley is smaller than that of the drive rotor.

3. An electromagnetic clutch device for a compressor according to claim 1, wherein the center of a region, in which pulley grooves are formed, of the pulley fixedly attached to the drive rotor and the mid-width of the clutch bearing are arranged at positions on the same line or close to each other.

4. An electromagnetic clutch device for a compressor according to claim 2, wherein the center of a region, in which pulley grooves are formed, of the pulley fixedly attached to the drive rotor and the mid-width of the clutch bearing are arranged at positions on the same line or close to each other.

5. An electromagnetic clutch device for a compressor, comprising:
    a drive shaft forming a part of a compressor mechanism which is accommodated in a housing of the compressor and projecting through a nose of the housing;
    a drive rotor accommodating a coil for the electromagnetic clutch and rotatably supported on the circumference of the nose by a clutch bearing;
    an armature plate opposing the coil and connected to a projecting end of the drive shaft so as to rotate with the drive shaft;
    a pulley fixedly attached to the drive rotor; and
    a coil stay having a first end fixedly attached to the coil and a second end directly attached to a front face of the housing, the coil stay having a projection on a surface facing the front face of the housing, the projection being received within a recess on the front face of the housing,
    wherein the pulley is arranged between the housing and the coil, and
    wherein the drive shaft is rotatably supported by the nose of the housing.

6. An electromagnetic clutch device for a compressor according to claim 5, wherein the drive shaft is rotatably support by a drive shaft bearing in the nose of the housing, and wherein the drive shaft bearing and the clutch bearing overlap in a direction extending perpendicular to an axis of the drive shaft.

7. An electromagnetic clutch device for a compressor, comprising:
    a drive shaft forming a part of a compressor mechanism which is accommodated in a housing of the compressor and projecting through a nose of the housing;
    a drive rotor accommodating a coil for the electromagnetic clutch and rotatably supported on the circumference of the nose by a clutch bearing;
    an armature plate opposing the coil and connected to a projecting end of the drive shaft so as to rotate with the drive shaft; and
    a pulley fixedly attached to the drive rotor,
    wherein the pulley is arranged between the housing and the coil, and
    wherein an outer diameter of the pulley is smaller than an outer diameter of the coil.

* * * * *